United States Patent
Wang

(10) Patent No.: US 9,396,735 B2
(45) Date of Patent: Jul. 19, 2016

(54) SYSTEM FOR REAL TIME AUDIO PROCESSING DRIVEN BY INTERRUPT AND TIMER EVENT

(71) Applicant: Zhonglei Wang, Mountain View, CA (US)

(72) Inventor: Zhonglei Wang, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 363 days.

(21) Appl. No.: 13/733,728

(22) Filed: Jan. 3, 2013

(65) Prior Publication Data

US 2015/0199971 A1   Jul. 16, 2015

(51) Int. Cl.
*G10L 19/00* (2013.01)
*G10L 19/16* (2013.01)
*G06F 3/16* (2006.01)
*G06F 9/46* (2006.01)

(52) U.S. Cl.
CPC .............. *G10L 19/16* (2013.01); *G06F 3/165* (2013.01); *G06F 9/46* (2013.01)

(58) Field of Classification Search
USPC ................................................. 704/500–504
See application file for complete search history.

(56) References Cited

U.S. PATENT DOCUMENTS

| | | | | |
|---|---|---|---|---|
| 6,081,783 A * | 6/2000 | Divine et al. | ................ | 704/500 |
| 6,125,398 A * | 9/2000 | Mirashrafi | .......... | H04L 12/1822 370/263 |
| 6,298,370 B1 * | 10/2001 | Tang | ................... | G06F 9/5044 718/100 |
| 2004/0268354 A1 * | 12/2004 | Kanai et al. | .................. | 718/100 |
| 2005/0108715 A1 * | 5/2005 | Kanai et al. | .................. | 718/100 |
| 2008/0307240 A1 * | 12/2008 | Dahan et al. | .................. | 713/320 |
| 2011/0197285 A1 * | 8/2011 | Ginter et al. | .................... | 726/27 |

* cited by examiner

*Primary Examiner* — Leonard Saint Cyr
(74) *Attorney, Agent, or Firm* — Birch, Stewart, Kolasch & Birch, LLP

(57) ABSTRACT

Provided are methods and systems for processing audio using a combination of interrupts and timer events. Buffer queues and timer events are configured and utilized between audio capture and encoding processes, and also between audio decoding and playout processes to deliver a fixed-rate audio packet and higher quality audio output. Thread execution priorities may be assigned to the capture and/or playout timer events, and such priorities may be automatically adjusted to conserve processing resources. By configuring timer events to drive audio encoding and decoding processes, and utilizing buffer queues to absorb variances in the timing of audio capture and playout interrupts, the methods and systems provided are able to deliver improved audio quality while conserving processing resources.

20 Claims, 7 Drawing Sheets

SYSTEM FOR REAL TIME AUDIO PROCESSING DRIVEN BY INTERRUPT AND TIMER EVENT

TECHNICAL FIELD

The present disclosure generally relates to methods and systems for audio processing. More particularly, aspects of the present disclosure relate to using interrupts and timer events to drive audio encoding and decoding processing.

BACKGROUND

Most real-time audio processing applications are driven by sound card interrupts. However, due to the nature of computer hardware and how operating systems handle sound card interrupts, if the interrupt received by the application is not synchronized with the hardware interrupt, many problems can result. Many applications rely on the timing information coming with an interrupt, and expect that the interrupt arrives at a fixed interval time. This is a typical minimal requirement for any real-time audio processing application.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a computer-implemented method for processing audio data input from a capture device, the method comprising: generating a capture interrupt event; in response to the capture interrupt event, copying audio data input from a capture device into an audio buffer; in response to a timer event, calculating a size of the audio buffer storing the audio data input from the capture device; comparing the size of the audio buffer with a detected latency of an operating system; and assigning a thread priority for encoding the audio data stored in the audio buffer based on the comparison of the size of the audio buffer with the detected latency of the operating system.

In another embodiment of the method for processing audio data input from a capture device, the step of assigning the thread priority for encoding the audio data includes: in response to the size of the audio buffer being greater than the detected latency of the operating system, assigning a first thread priority for encoding the audio data; and in response to the size of the audio buffer being less than the detected latency of the operating system, assigning a second thread priority for encoding the audio data, wherein the first thread priority is higher than the second thread priority.

In yet another embodiment, the method for processing audio data input from a capture device further comprises encoding the audio data stored in the audio buffer, and transmitting the encoded audio data over a network to a receiver.

In another embodiment, the method for processing audio data input from a capture device further comprises, in response to the timer event, detecting latency of an operating system.

In still another embodiment, the method for processing audio data input from a capture device further comprises creating a timer event, and assigning the second thread priority to the timer event.

Another embodiment of the present disclosure relates to a computer-implemented method for processing audio data received for playout, the method comprising: in response to a timer event, calculating a size of an audio buffer configured for storing audio data for playout; comparing the size of the audio buffer with a detected latency of an operating system; assigning a thread priority for decoding audio data received over a network based on the comparison of the size of the audio buffer with the detected latency of the operating system; and decoding the audio data received over the network according to the assigned thread priority.

In another embodiment, the method for processing audio data received for playout further comprises storing the decoded audio data in the audio buffer, and in response to a playout interrupt event, sending the audio data stored in the audio buffer to a playout device.

In another embodiment of the method for processing audio data received for playout, the step of assigning the thread priority for decoding the audio data includes: in response to the size of the audio buffer being less than the detected latency of the operating system, assigning a first thread priority for decoding the audio data; and in response to the size of the audio buffer being greater than or equal to the detected latency of the operating system, assigning a second thread priority for decoding the audio data, wherein the first thread priority is higher than the second thread priority.

In yet another embodiment, the method for processing audio data received for playout further comprises creating a timer event, and assigning the second thread priority to the timer event.

In still another embodiment, the method for processing audio data received for playout further comprises, in response to the timer event, detecting latency of an operating system.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
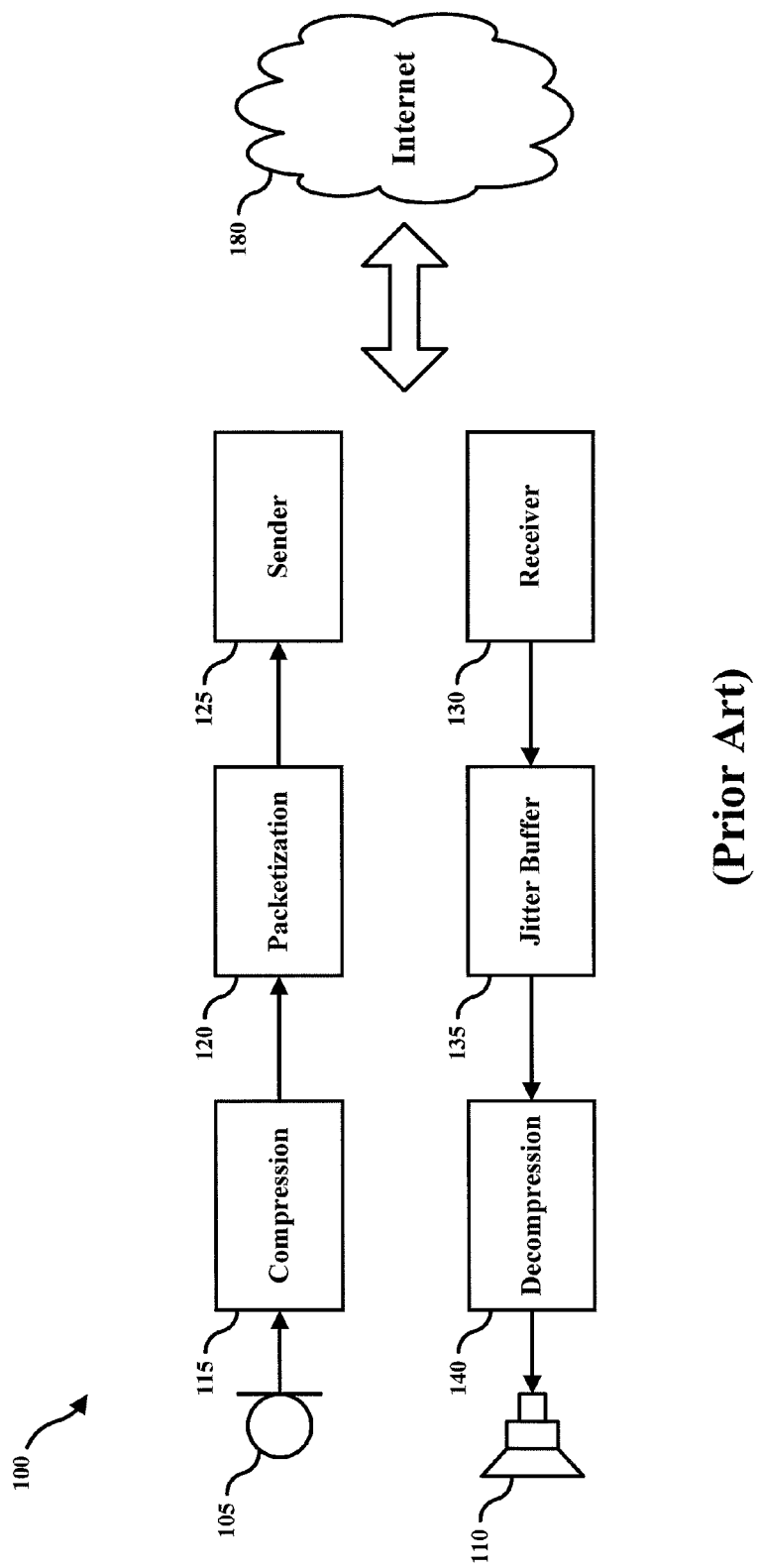
FIG. 1 is a block diagram illustrating an example of a conventional real-time audio processing application.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that the embodiments described herein may be practiced without many of these details. Likewise, one skilled in the relevant art will also understand that the embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for processing audio using interrupt and timer events. As will be described in greater detail herein, buffer queues and timer events may be configured and utilized between audio capture and encoding processes, and also between audio decoding and playout processes to deliver a fixed-rate audio packet and higher quality audio output. Additionally, thread execution priorities may be assigned to the capture and/or playout timer events, and such priorities may be automatically adjusted to conserve processing resources. The utilization of capture and playout timer events in combination with buffer queues, as well as the setting and adjusting of thread priorities for such capture and playout timer events will described in further detail below.

By configuring timer events to drive audio encoding and decoding processes, and utilizing buffer queues to absorb variances in the timing of audio capture and playout interrupts, the methods and systems described herein deliver improved audio quality while conserving processing resources.

FIG. 1 illustrates a conventional real-time audio processing application 100. A microphone 105 generates an interrupt signal that indicates audio data is available. The application 100 copies captured audio data from the microphone 105, compresses 115 the data, packetizes 120 the compressed data, and sends 125 the packetized data out to the Internet 180 for transmission to one or more recipients.

The application 100 also receives 130 audio packets from the Internet 180 and places the audio packets into a jitter buffer 135. A speaker 110 generates an interrupt signal that indicates memory is available in the speaker 110. The application 100 then fetches an audio packet from the jitter buffer 135, decompresses 140 the audio packet, and pushes the decompressed audio data into the speaker 110 for playout.

As described above, such a conventional approach to real-time audio processing does not work well if the microphone 105 or speaker 110 interrupt is not synchronized with the hardware interrupt.

Figure 2:
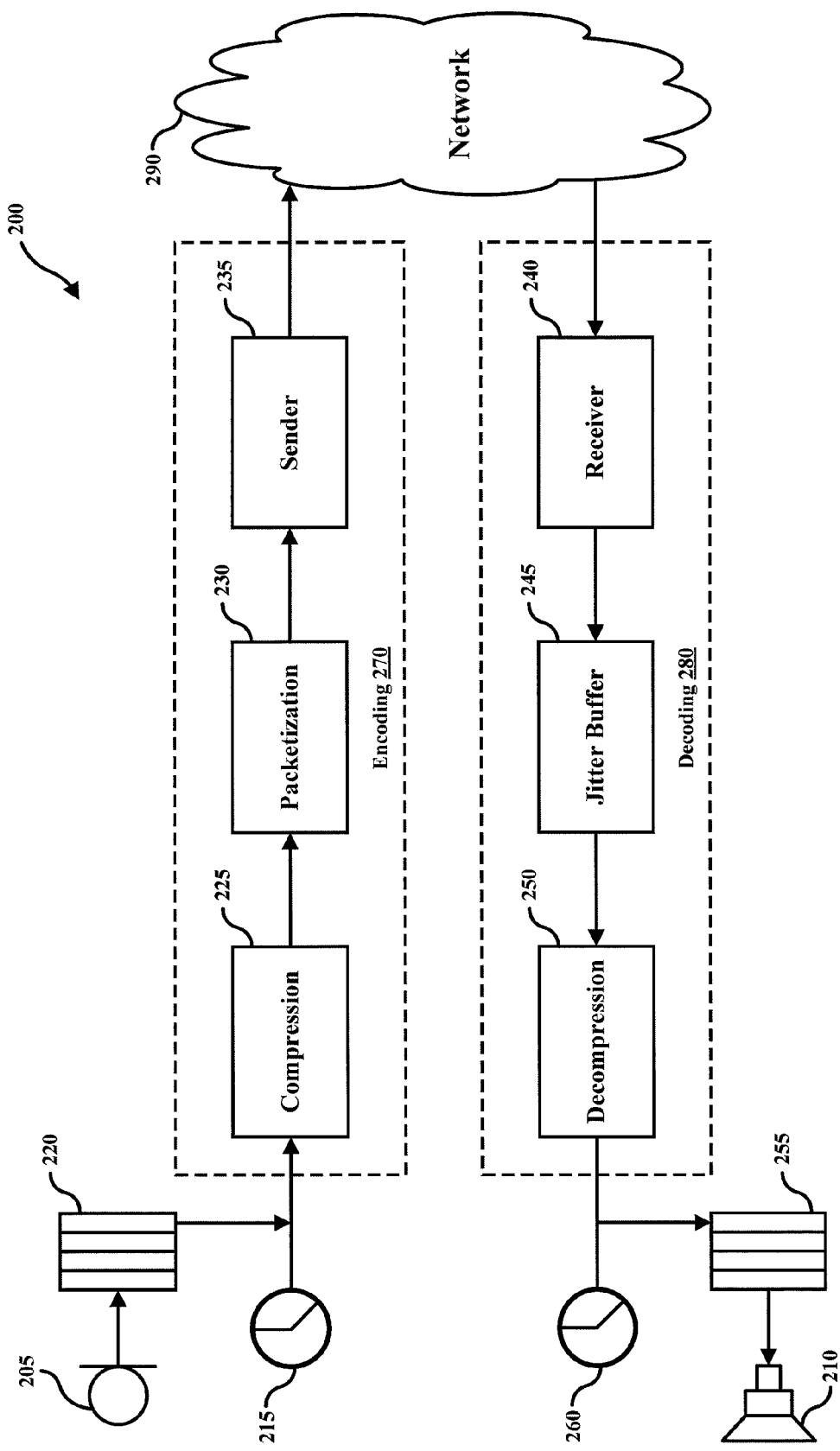
FIG. 2 is a block diagram illustrating an example system for real-time audio processing using interrupts and timer events to drive audio encoding and decoding according to one or more embodiments described herein.

FIG. 2 illustrates an example system for real-time audio processing according to one or more embodiments of the present disclosure, in which interrupts and timer events are used to drive audio encoding and decoding processes. In at least the embodiment shown, the real-time audio processing system 200 includes audio capture 205, audio playout 210, and audio encoding 270 and decoding 280 paths or processes. The system 200 may be in communication with one or more other systems and/or devices via a network 290.

Audio capture 205 may be performed by any of a variety of audio input devices, such as one or more microphones configured to capture sound (e.g., voice) and generate input signals. Audio playout 210 may be performed by any of a variety of audio output devices, including a loudspeaker or group of loudspeakers configured to output sound of one or more channels. For example, audio capture 205 and audio playout 210 may be hardware devices internal to a computer system, or external peripheral devices connected to a computer system via wired and/or wireless connections. In some arrangements, audio capture 205 and audio playout 210 may be components of a single device, such as a mobile telephone, speakerphone, portable telephone handset, etc. Additionally, one or both of audio capture 205 and audio playout 210 may include analog-to-digital and/or digital-to-analog transformation functionalities.

The system 200 may also include a capture buffer queue 220 and a capture timer event 215 configured between the audio capture 205 and encoding 270 processes, and may also include a playout buffer queue 255 and a playout timer event 260 configured between the decoding 280 and audio playout 210 processes. In at least one embodiment, audio data may be copied from the audio capture device 205 (e.g., a microphone) and stored in the capture buffer queue 220. Based on the configuration of the capture timer event 215, the system or application 200 may periodically retrieve the audio data stored in the capture buffer queue 220 and pass the audio data to the encoding process 270, where the data is compressed 225, packetized 230, and transmitted 235 over the network 290.

Additionally, audio data received 240 by the system 200 may pass through the decoding process 280, where the received data undergoes jitter buffering 245 and decompression 250. The decoder 280 may then store the received audio data in the playout buffer queue 255. As will be further described below, the audio playout device 210 may fetch the data stored in the playout buffer queue when the playout timer event 260 occurs.

It should be noted that, depending on the implementation, the encoding 270 and/or decoding 280 may be performed by a single component or by several components in the system 200. Additionally, either of the encoding 270 and/or decoding 280 processes may be a sub-process in a larger audio processing scheme (not shown). In some embodiments of the present disclosure, one or more other components, modules, units, etc., may be included as part of the real-time audio processing system 200, in addition to or instead of those illustrated in FIG. 2.

Figure 3:
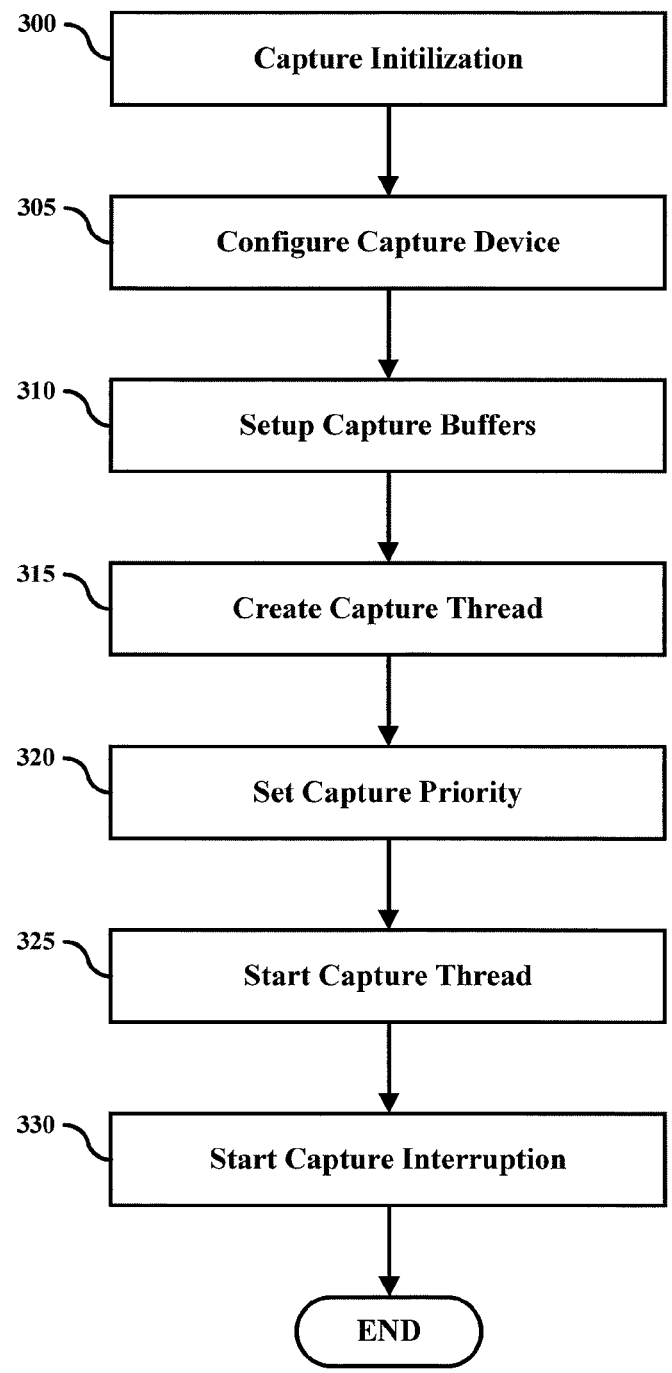
FIG. 3 is a flowchart illustrating an example method for configuring audio capture interrupts and timer events according to one or more embodiments described herein.

FIG. 3 illustrates an example process for configuring audio capture interrupts and timer events according to one or more embodiments described herein.

The process begins at block 300 where capture configuration may be initialized. In block 305, the process may configure an audio capture device (e.g., audio capture device 205 as shown in FIG. 2), which may include detecting hardware and/or operating system latency. For example, system latency may be detected as K milliseconds (ms) (where "K" is an arbitrary number).

In block 310, one or more capture buffer queues (e.g., capture buffer queue 220 as shown in FIG. 2) may be setup and prepared for storing incoming audio data (e.g., voice data) from the capture device. In at least one embodiment, block 310 may include specifying various parameters of the one or more capture buffers, including name, type, and/or size of the buffer. For example, the capture buffer queue may be configured as K+a ms (where "a" is also an arbitrary number and may be the same as or different than "K"). Additionally, the one or more capture buffer queues may be configured to store incoming data in a certain direction and/or perform certain actions when incoming data is received into the buffer (e.g., add timestamp to data).

The process continues from block 310 to block 315 where a capture thread (e.g., a capture timer event) may be created. In block 320 the capture timer event created in block 315 may be set to "normal" thread priority (e.g., thread priority "0"). In at least one embodiment, "normal" thread priority may be considered a thread priority or "0" while a "high" thread priority may be considered a thread priority typically assigned to audio processing, such as "16" or the like.

Figure 4:
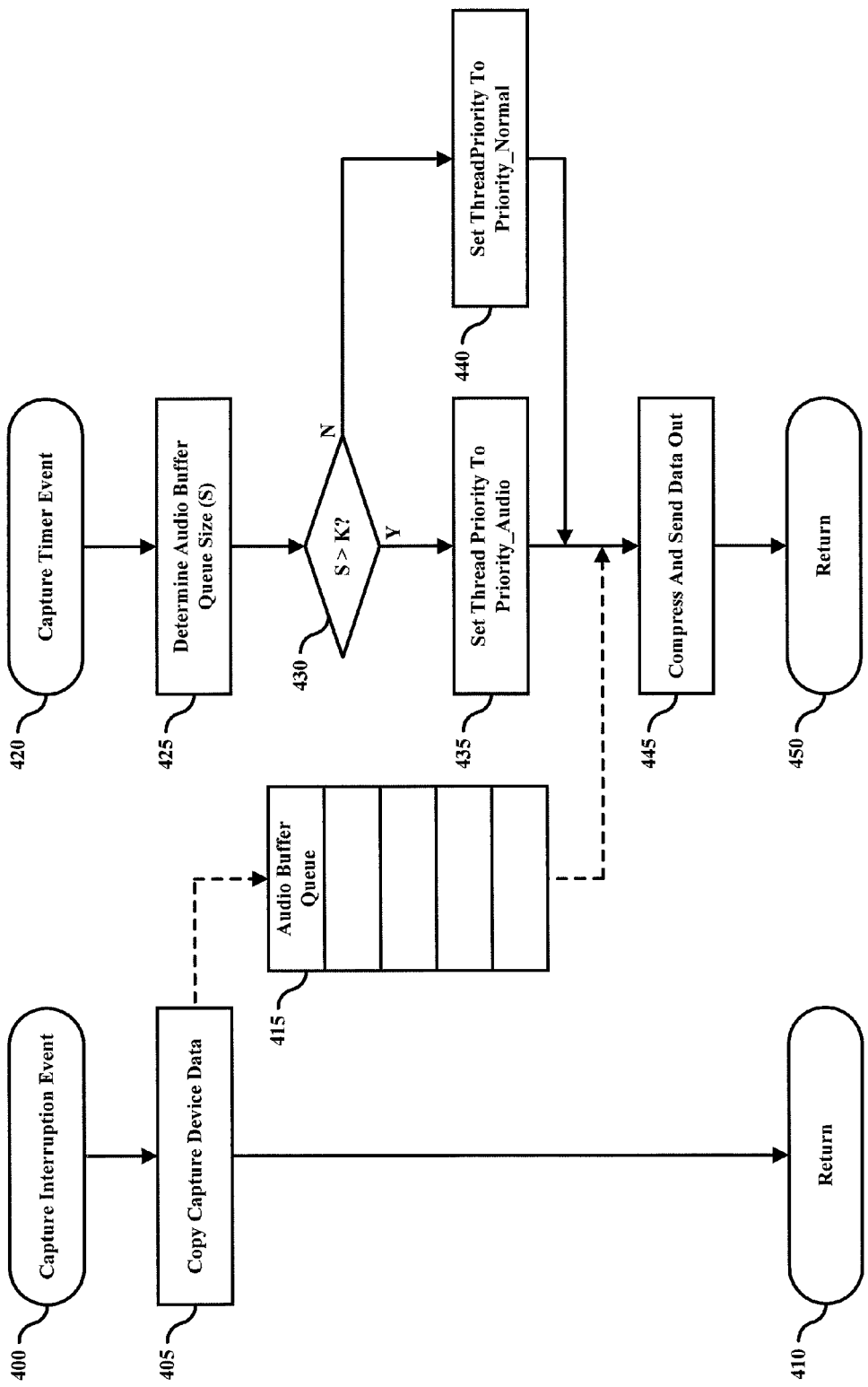
FIG. 4 is a flowchart illustrating an example method for encoding captured audio based on capture interrupts and timer events according to one or more embodiments described herein.

The process then moves from block 320 to block 325 where an audio capture thread is executed, followed by block 330 in which a capture interrupt is initiated, as illustrated in FIG. 4 and further described below.

FIG. 4 illustrates an example process for encoding audio data based on capture interrupts and timer events according to one or more embodiments of the present disclosure.

The process initiates at block 400 with the entry of a capture interruption event. In at least one embodiment, the process illustrated in FIG. 4 may initiate as a result of the start capture interruption block 330 shown in the example process of FIG. 3. In block 405, audio data may be copied from an audio input or capture device, such as a microphone, and in block 415 the copied audio data may be added into an audio buffer queue (e.g., capture buffer queue 220 as shown in FIG. 2). Additionally, once the audio data is copied from the audio input device in block 405, the process may also move to block 410 where process returns to the state prior to the capture interrupt event.

Block 420 is the entry point of a capture timer event. In at least one embodiment, the entry of a capture timer event may occur at predetermined intervals of time (e.g., every 10 ms). At block 425, the size of the audio buffer queue (e.g., capture buffer queue 220 as shown in FIG. 2) may be determined, where the size of the audio buffer queue may be denoted as S.

At block 430, a comparison may be made between the audio buffer queue size S determined at block 425 and hardware and/or operating system latency, denoted as K (e.g., the hardware and/or operating system latency that may be detected at block 305 in the example process shown in FIG. 3). If it is determined at block 430, based on the comparison between S and K, that the size of the current audio buffer queue is greater than the system latency, then in block 435 the thread priority may be set to that of "audio" (e.g., a thread priority of "16"). On the other hand, if it is determined at block 430, based on the comparison between S and K, that the size of the current audio buffer queue is less than the system latency, then in block 440 the thread priority may be set to "normal" (e.g., a thread priority of "0").

Once the thread priority has been set in either block 435 or block 440, the process moves to block 445 where audio data from the audio buffer queue (e.g., capture buffer queue 220 as shown in FIG. 2) may be compressed and sent out for transmission. In block 450, the process may repeat for the next capture timer event.

Figure 5:
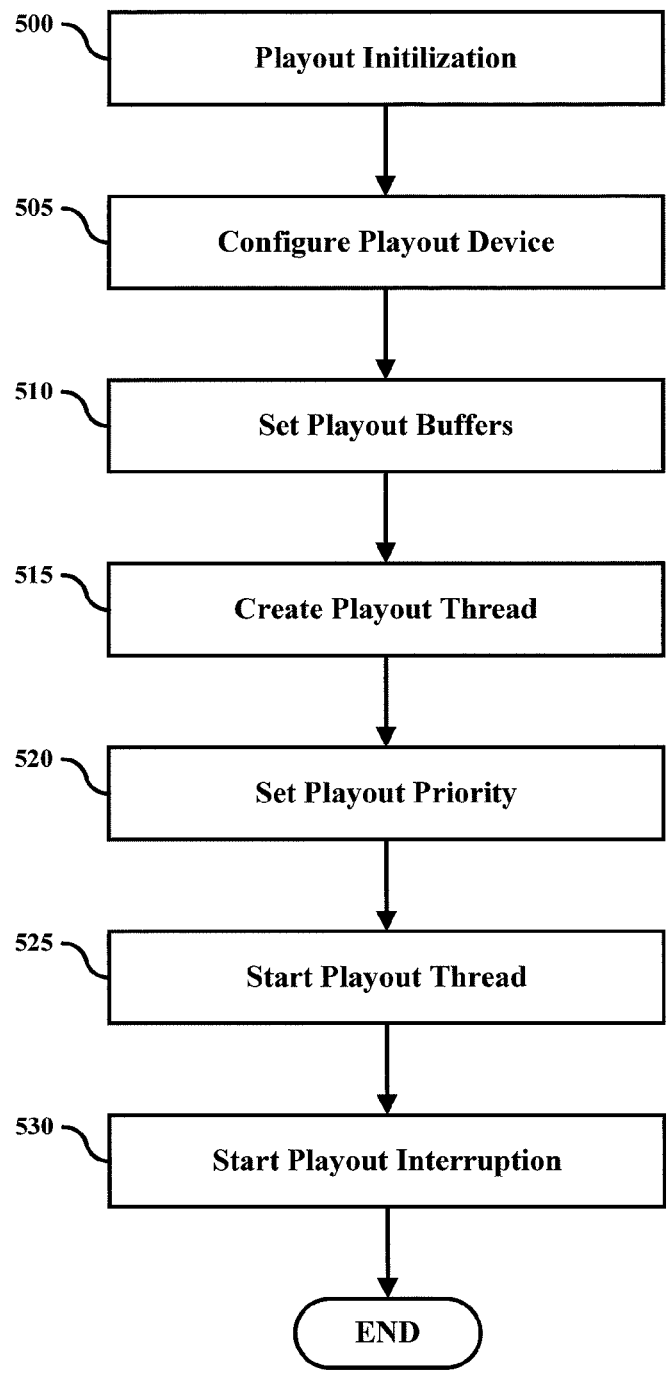
FIG. 5 is a flowchart illustrating an example method for configuring audio playout interrupts and timer events according to one or more embodiments described herein.

FIG. 5 illustrates an example process for configuring audio playout interrupts and timer events according to one or more embodiments described herein.

The process begins at block 500 where playout configuration may be initialized. In block 505, the process may configure an audio playout device (e.g., audio playout device 210 as shown in the example arrangement of FIG. 2), which may include detecting hardware and/or operating system latency. For example, system latency may be detected as J ms (where "J" is an arbitrary number).

In block 510, one or more playout buffer queues (e.g., playout buffer queue 255 as shown in FIG. 2) may be setup and prepared for storing incoming audio data (e.g., voice data) from the capture device. In at least one embodiment, block 510 may include specifying various parameters of the one or more playout buffers, including name, type, and/or size of the buffer. For example, the playout buffer queue may be configured as J+b ms (where "b" is also an arbitrary number and may be the same as or different than "J"). Additionally, the one or more playout buffer queues may be configured to store incoming data in a certain direction and/or perform certain actions when incoming data is received into the buffer (e.g., add timestamp to data).

Following block 510, the process moves to block 515 where a playout thread (e.g., a playout timer event) may be created. In block 520, the playout thread created in block 515 may be set to "normal" thread priority (e.g., thread priority "0"). Similar to the thread priority assignments that may be utilized in connection with capture timer events (as described above and illustrated in FIGS. 3 and 4), in block 520 of the process shown in FIG. 5, a "normal" thread priority may be considered a thread priority or "0" while a "high" thread priority may be considered a thread priority typically assigned to audio processing, such as "16".

Figure 6:
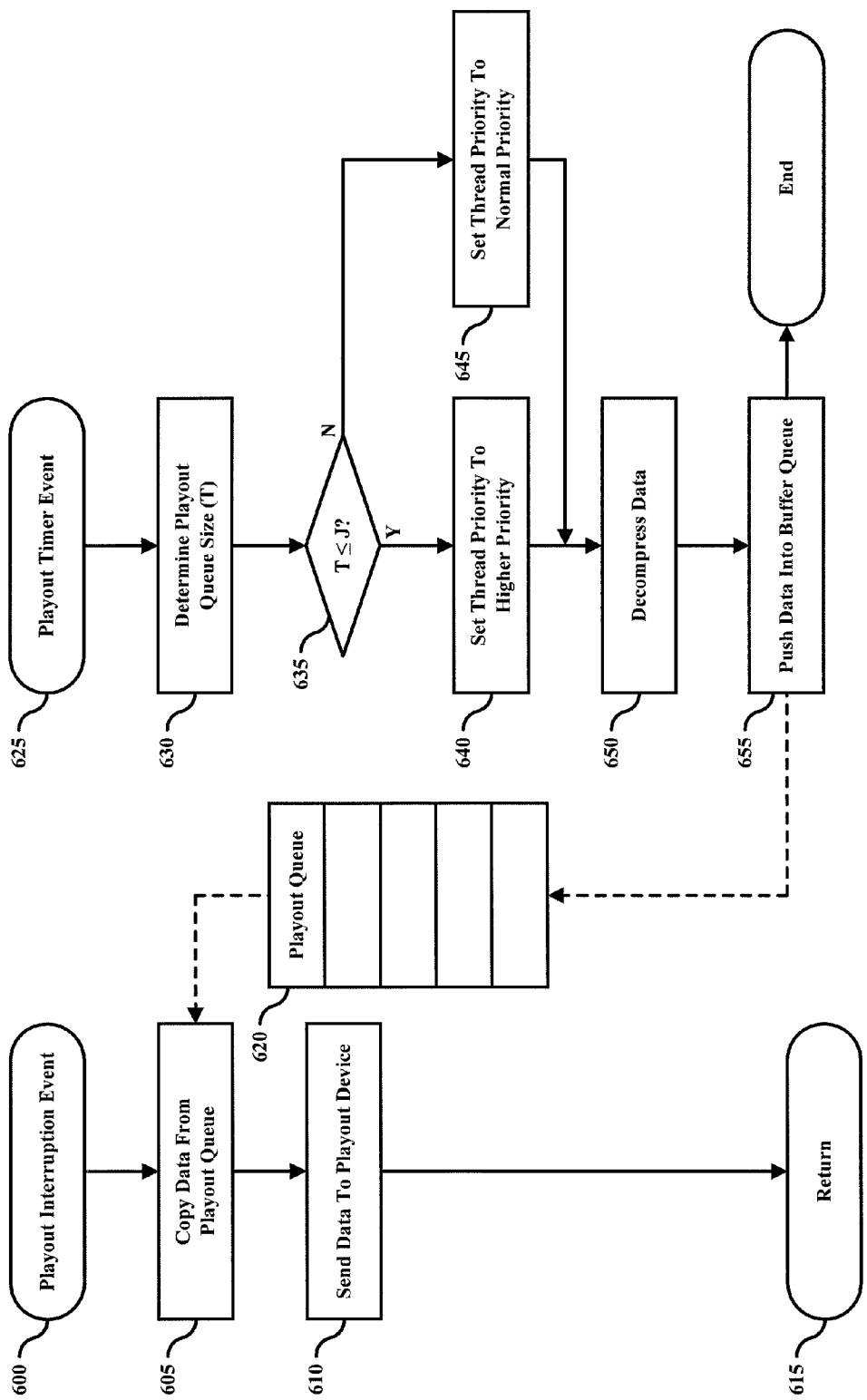
FIG. 6 is a flowchart illustrating an example method for decoding audio for playout based on playout interrupts and timer events according to one or more embodiments described herein.

The process moves from block 520 to block 525 where an audio playout thread is executed, followed by block 530 in which a playout interrupt is initiated, as illustrated in FIG. 6 and described in further detail below.

FIG. 6 illustrates an example process for decoding audio data for playout based on playout interrupts and timer events according to one or more embodiments described herein.

The process initiates at block 600 with the entry of a playout interruption event. In at least one embodiment, the process illustrated in FIG. 6 may initiate as a result of the start playout interruption block 530 shown in the example process of FIG. 5. In block 605, audio data may be copied from an audio buffer queue (e.g., playout queue 620 as shown in FIG. 6, which may be similar to playout buffer queue 255 as shown in FIG. 2), and in block 610 the copied audio data may be sent to an audio output device, such as a loudspeaker, for playout. Additionally, once the audio data is sent to the playout device in block 610, the process may move to block 615 where process returns to the state prior to the playout interruption event.

Block 625 is the entry point of a playout timer event. In at least one embodiment, the entry of a playout timer event may occur at predetermined intervals of time (e.g., every 10 ms). At block 630, the size of the audio buffer queue (e.g., playout queue 620 as shown in FIG. 6, which may be similar to playout buffer queue 255 as shown in FIG. 2) may be determined, where the size of the audio buffer queue may be denoted as T.

At block 635, a comparison may be made between the audio buffer queue size T determined at block 630 and hardware and/or operating system latency, denoted as J (e.g., the hardware and/or operating system latency that may be detected at block 505 in the example process shown in FIG. 5). If it is determined at block 635, based on the comparison between T and J, that the size of the current audio buffer queue is less than the system latency, then in block 640 the playout thread priority may be set to that of "audio" (e.g., a thread priority of "16"). On the other hand, if it is determined at block 635, based on the comparison between T and J, that the size of the current audio buffer queue is greater than or equal to the system latency, in block 645 the playout thread priority may be set to "normal" (e.g., a thread priority of "0").

Once the thread priority has been set in either block 640 or block 645, the process moves to block 650 where audio data for playout is decompressed. In step 655, the decompressed audio data is pushed into the playout queue 620 (which in at least one embodiment may be similar to playout buffer queue 255 as shown in FIG. 2), where the data may be copied for playout in block 605, as described above.

Figure 7:
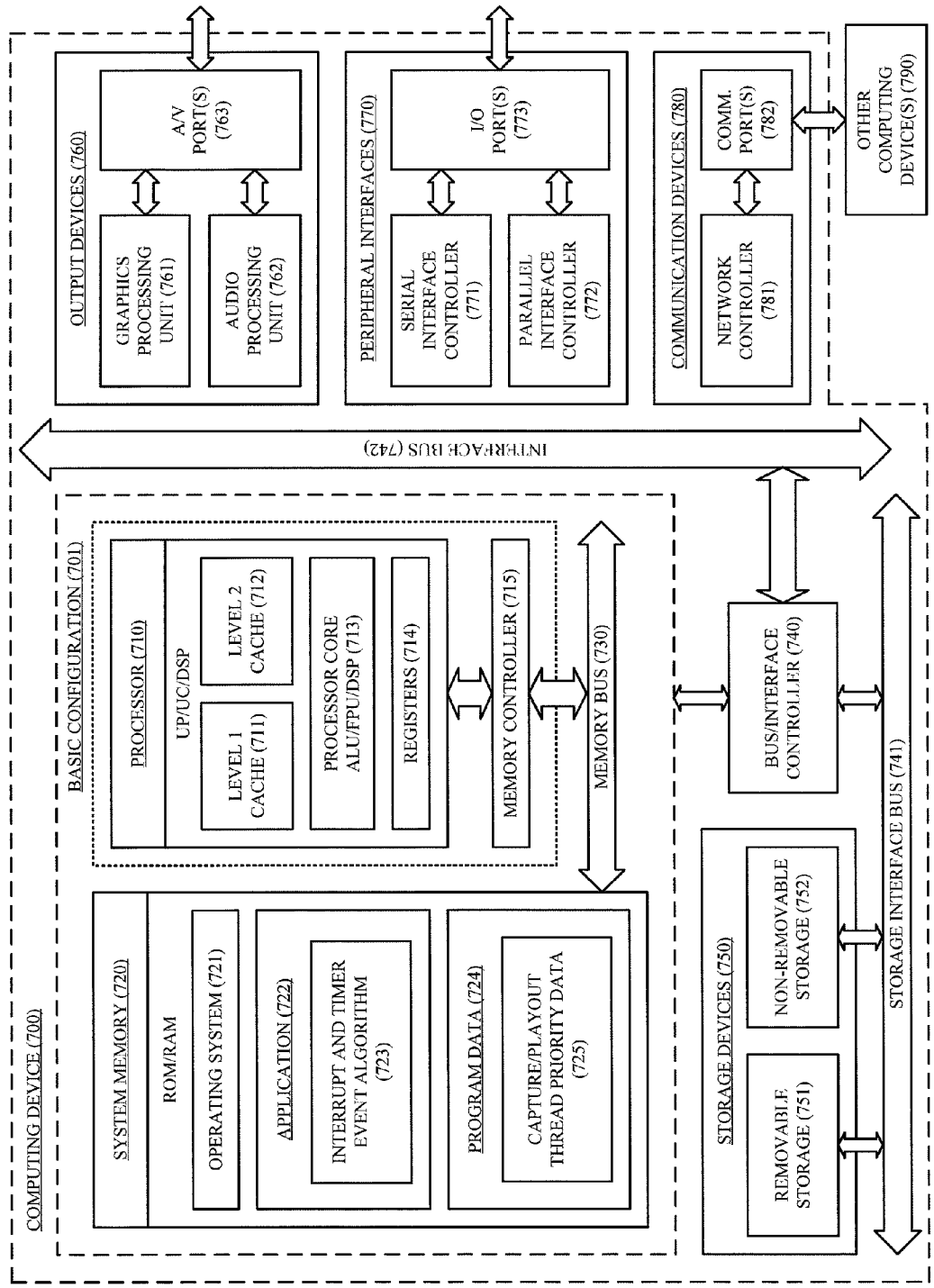
FIG. 7 is a block diagram illustrating an example computing device arranged for encoding and decoding audio data based on interrupts and timer events according to one or more embodiments described herein.

FIG. 7 is a block diagram illustrating an example computing device 700 arranged for encoding and decoding audio data based on capture and playout interrupts and timer events in accordance with one or more embodiments of the present disclosure. In a very basic configuration 701, computing device 700 typically includes one or more processors 710 and system memory 720. A memory bus 730 may be used for communicating between the processor 710 and the system memory 720.

Depending on the desired configuration, processor 710 can be of any type including but not limited to a microprocessor (IP), a microcontroller (iC), a digital signal processor (DSP), or any combination thereof. Processor 710 may include one or more levels of caching, such as a level one cache 711 and a level two cache 712, a processor core 713, and registers 714. The processor core 713 may include an arithmetic logic unit (ALU), a floating point unit (FPU), a digital signal processing core (DSP Core), or any combination thereof. A memory controller 715 can also be used with the processor 710, or in some embodiments the memory controller 715 can be an internal part of the processor 710.

Depending on the desired configuration, the system memory 720 can be of any type including but not limited to volatile memory (e.g., RAM), non-volatile memory (e.g., ROM, flash memory, etc.) or any combination thereof. System memory 720 typically includes an operating system 721, one or more applications 722, and program data 724. In at least some embodiments, application 722 includes an interrupt and timer event algorithm 723 that may be configured to create and utilize a capture timer event and capture buffer queue (e.g., capture timer event 215 and capture buffer queue 220 as shown in the example system of FIG. 2) between audio capture and encoding processes (e.g., audio capture device 205 and audio encoding path 270 as shown in the example system of FIG. 2). The interrupt and timer event algorithm 723 may be further configured to create and utilize a playout timer event and playout buffer queue (e.g., playout timer event 260 and playout buffer queue 255 as shown in the example system of FIG. 2) between audio decoding and playout processes (e.g., audio decoding path 280 and audio render device 210 as shown in the example system of FIG. 2).

Program Data 724 may include capture/playout thread priority data 725 that is useful for determining execution priorities for capture and/or playout timer events. In some embodiments, application 722 can be arranged to operate with program data 724 on an operating system 721 such that the interrupt and timer event algorithm 723 may utilize the capture/playout thread priority data 725 to set a capture or playout timer event to, e.g., "normal" priority or "high" priority.

Computing device 700 can have additional features and/or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of computing device 700.

Computing device 700 can also include an interface bus 742 for facilitating communication from various interface devices (e.g., output interfaces, peripheral interfaces, communication interfaces, etc.) to the basic configuration 701 via the bus/interface controller 740. Example output devices 760 include a graphics processing unit 761 and an audio processing unit 762, either or both of which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773.

An example communication device 780 includes a network controller 781, which can be arranged to facilitate communications with one or more other computing devices 790 over a network communication (not shown) via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented method for processing audio data, the method comprising:
   generating a capture interrupt event;
   in response to the capture interrupt event, copying audio data input from a capture device into an audio buffer configured to store the audio data according to one or more specified parameters;
   in response to a capture timer event, calculating an amount of audio data stored in the audio buffer, wherein the capture timer event is associated with a thread execution priority for encoding the audio data stored in the audio buffer;
   comparing the amount of audio data stored in the audio buffer with a detected latency of an operating system associated with the capture device;
   in response to the comparison indicating that the amount of audio data stored in the audio buffer satisfies a threshold, adjusting the thread execution priority for encoding the audio data stored in the audio buffer; and
   providing the audio data stored in the audio buffer to an encoder based on the thread execution priority or the adjusted thread execution priority.

2. The method of claim 1, further comprising:
   encoding the audio data stored in the audio buffer; and
   transmitting the encoded audio data over a network to a receiver.

3. The computer-implemented method of claim 1, further comprising, in response to the capture timer event, detecting the latency of the operating system.

4. The method of claim 1, further comprising:
   creating the capture timer event; and assigning the thread execution priority to the capture timer event.

5. The method of claim 1, wherein the capture timer event is executed at 10 millisecond intervals.

6. A computer-implemented method for processing audio data, the method comprising:
in response to a playout timer event, calculating an amount of audio data stored in an audio buffer configured for storing audio data for payout according to one or more specified parameters, wherein the playout timer event is associated with a thread execution priority for decoding audio data received over a network;
comparing the amount of audio data stored in the audio buffer with a detected latency of an operating system associated with the audio buffer;
in response to the comparison indicating that the amount of audio data stored in the audio buffer satisfies a threshold, adjusting the thread execution priority for decoding audio data received over the network; and
transmitting to a decoder for decoding the audio data received over the network according to the thread execution priority or the adjusted thread execution priority.

7. The method of claim 6, further comprising:
storing the decoded audio data in the audio buffer; and
in response to the playout interrupt event, sending the audio data stored in the audio buffer to a playout device.

8. The method of claim 6, further comprising:
creating the playout timer event; and
assigning the thread execution priority to the playout timer event.

9. The computer-implemented method of claim 6, further comprising, in response to the playout timer event, detecting the latency of the operating system.

10. The method of claim 6, wherein the playout timer event is executed at 10 millisecond intervals.

11. A system for processing audio data, the system comprising:
at least one processor; and
a non-transitory computer-readable medium coupled to the at least one processor having instructions stored thereon that, when executed by the at least one processor, causes the at least one processor to:
generate a capture interrupt event;
in response to the capture interrupt event, copy audio data input from a capture device into an audio buffer configured to store the audio data according to one or more specified parameters;
in response to a capture timer event, calculate an amount of audio data stored in the audio buffer, wherein the capture timer event is associated with a thread execution priority for encoding the audio data stored in the audio buffer;
compare the amount of audio data stored in the audio buffer with a detected latency of an operating system associated with the capture device;
in response to the comparison indicating that the amount of audio data stored in the audio buffer satisfies a threshold, adjust the thread execution priority for encoding the audio data stored in the audio buffer; and
transmit to an encoder for encoding the audio data stored in the audio buffer according to the thread execution priority or the adjusted thread execution priority.

12. The system of claim 11, wherein the at least one processor is further caused to:
transmit the encoded audio data over a network to a receiver.

13. The system of claim 11, wherein the at least one processor is further caused to:
in response to the capture timer event, detect the latency of the operating system.

14. The system of claim 11, wherein the at least one processor is further caused to:
create the capture timer event; and
assign the thread execution priority to the capture timer event.

15. The system of claim 11, wherein the capture timer event is executed at 10 millisecond intervals.

16. A system for processing audio data, the system comprising:
at least one processor; and
a non-transitory computer-readable medium coupled to the at least one processor having instructions stored thereon that, when executed by the at least one processor, causes the at least one processor to:
in response to a payout timer event, calculate an amount of audio data stored in an audio buffer configured for storing audio data for playout according to one or more specified parameters, wherein the playout timer event is associated with a thread execution priority for decoding audio data received over a network;
compare the amount of audio data stored in the audio buffer with a detected latency of an operating system associated with the audio buffer;
in response to the comparison indicating that the amount of audio data stored in the audio buffer satisfies a threshold, adjust the thread execution priority for decoding audio data received over the network; and
transmit to a decoder for decoding the audio data received over the network according to the thread execution priority or the adjusted thread execution priority.

17. The system of claim 16, wherein the at least one processor is further caused to:
store the decoded audio data in the audio buffer; and
in response to a playout interrupt event, send the audio data stored in the audio buffer to a playout device.

18. The system of claim 16, wherein the at least one processor is further caused to:
create the playout timer event; and
assign the thread execution priority to the playout timer event.

19. The system of claim 16, wherein the at least one processor is further caused to:
in response to the playout timer event, detect the latency of the operating system.

20. The system of claim 16, wherein the playout timer event is executed at 10 millisecond intervals.

* * * * *